April 7, 1970  E. S. PERKINS  3,505,676
NAVIGATION SYSTEM
Filed Feb. 13, 1968  4 Sheets-Sheet 2

INVENTOR.
EARL STUART PERKINS

BY *[signature]*  ATTORNEYS

April 7, 1970  E. S. PERKINS  3,505,676
NAVIGATION SYSTEM

Filed Feb. 13, 1968  4 Sheets-Sheet 4

Fig. 7

INVENTOR.
EARL STUART PERKINS

BY  ATTORNEYS

United States Patent Office 3,505,676
Patented Apr. 7, 1970

3,505,676
NAVIGATION SYSTEM
Earl Stuart Perkins, Oak Brook, Ill., assignor to Butler National Corporation, Minneapolis, Minn., a corporation of Delaware
Filed Feb. 13, 1968, Ser. No. 705,202
Int. Cl. G01s 1/16
U.S. Cl. 343—107                 6 Claims

ABSTRACT OF THE DISCLOSURE

A method and system of aircraft navigation which allows more accurate and precise control than has previously been possible by utilizing improved navigation receivers, indicators and remote control systems so that greatly improved accuracy results. Systems and methods for making transition from an improved cross-country navigation system to an improved instrument landing system are also incorporated in this invention. Certain embodiments include smoothing and processing of navigation information from radio receivers and other sensors to provide an improved navigation system. The selection and use of matched detectors, filters, transformers and indicators in navigation receivers provides greatly improved navigation results.

CROSS REFERENCE TO RELATED APPLICATION

This application is related to co-pending application entitled "Aircraft Navigation System" filed May 31, 1966, U.S. Ser. No. 559,650.

BACKGROUND OF THE INVENTION

Field of the invention

This invention consists of methods and systems of aircraft navigation in which greatly increased accuracy is obtained by utilizing improved radiant energy receivers, indicators, follow-up systems and controls. Improved processing of information from the radiant energy receivers and other sensors results in precision previously thought unattainable and greatly enhances the safety of aircraft navigation and control.

Although many of the features of the invention are applicable to control of ships and vehicles other than aircraft, because of the overwhelming significance of the invention in the field of aircraft safety, it will be described with aircraft control as the preferred embodiment, although the invention is not to be so limited.

DESCRIPTION OF THE PRIOR ART

In the early days after the invention of the airplane by the Wright Brothers, aircraft navigation was primarily accomplished by visual reference to landmarks. The use of signal fires along a desired track was used for night cross-country flights, for example.

Gradually, aircraft engines and airplanes became larger and more reliable, the need for better navigation systems arose. Dead reckoning systems such as used on shipboard and based on compass, airspeed and time measurements came into use. Improved light beacon systems also came into use.

However, it soon became obvious that greatly improved aircraft control and indicating systems were imperative and the use of radio signals came into use. Also the pioneer invention of the gyroscope allowed bank and turn instruments and stabilized compass systems to come into use.

Low frequency radio range systems came into use wherein airways were marked by audible "A" and "N" code signals. Since "A" is dot-dash and "N" is dash-dot, a zone of continuous non-varying sound indicated the "on course" position.

Subsequently VOR omnirange radio navigation facilities were installed in which any radial could be selected by a pilot as a desired track. VOR transmits a pair of signals whose phase relation identifies a particular radial.

The most critical navigation problem of aircraft is to locate and make a safe landing particularly under adverse weather conditions. Instrument landing systems were developed which produced glide slope signals to control the approach altitude and localizer signals for controlling the craft in the horizontal plane. These systems presently utilize equal signal zones based on 90 and 150 cycle signals modulated on suitable carriers. These signals are detected and rectified and compare to indicate the zone of equal amplitude.

The poorer the visibility becomes the more important landing systems become. Conditions of poor visibility often occur during thunderstorms and conditions which make radio transmission and reception poor and for many years it has been assumed that the transmitted signals in VOR and ILS were subjected to many perturbations and that nothing could be done to improve the transmitted signals.

SUMMARY OF THE INVENTION

I have discovered that many of the perturbations and scallops believed to be inherent in the transmitted signals in aircraft navigation systems are actually generated in the radio receivers and that as a matter of fact, the transmitted signals are much better than has previously been recognized. Since the early days of radio navigation it has been assumed and taught that the transmitted signals were inaccurate and that very little could be done about it whereas in fact, I have discovered that many of the errors previously attributable to the transmitter are actually generated in the receiver.

For example, in VOR receivers two thirty hertz signals are detected and their phase compared to indicate a bearing to or from the station. I have discovered that VOR receivers respond to amplitude fluctuations as well as to the desired phase difference between the two 30 hertz channels. One error introduced by the receiver occurs in the rectification circuits of the receiver which generate the VOR bearing and the to-from meter indications. An error introduced in the receiver is caused by the non-symmetrical filter characteristics of the 30 hertz filter. The various servo systems operate as filters and asymmetry in them can introduce errors. Another error occurs from amplitude effects in the detection of the F-M subcarrier.

Instrument landing systems the two modulating tones 90 and 150 hertz are detected and rectified and fed to an indicator or autopilot systems. I have discovered that non-symmetrical response in the two detection and rectifying channels causes effects which have previously been assumed to be inherent in the transmitted signal but which actually originate in the receiver. The 90 and 10 hertz signals are filtered after detection and errors are introduced in this step. For example, non-symmetrical hysteresis loss in filters of the two channels will give non-symmetrical results at the output.

I have also found that the responses of indicators and autopilots are non-linear and non-symmetrical which can introduce errors previously thought to be inherent in the transmitted signals.

The present invention comprises detection, rectifying, filtering, indicating, monitoring and processing of received radiant energy so that more accurate control of aircraft can occur resulting in improved safety of aviation.

With my improved techniques, safe flight can occur under conditions previously deemed impossible.

Other objects, features and advantages of the present invention will be readily apparent from the following detailed description of certain preferred embodiments thereof taken in conjunction with the accompanying drawings.

DESCRIPTION OF THE PREFERRED EMBODIMENTS

I have discovered that many of the scallops and perturbations which have been assumed from the start of radio navigation were inherent in the transmitted signal, are, in fact, caused by the navigation receivers, including the detection circuits, filtering circuits, non-symmetrical hysteresis losses in indicators and transformers, and lack of symmetrical response in indicator and autopilots. For example, amplitude variation of the reference and variable phase signals in a VOR receiver will cause the amplitude to vary although the phase of the signals remains fixed.

Figure 1:
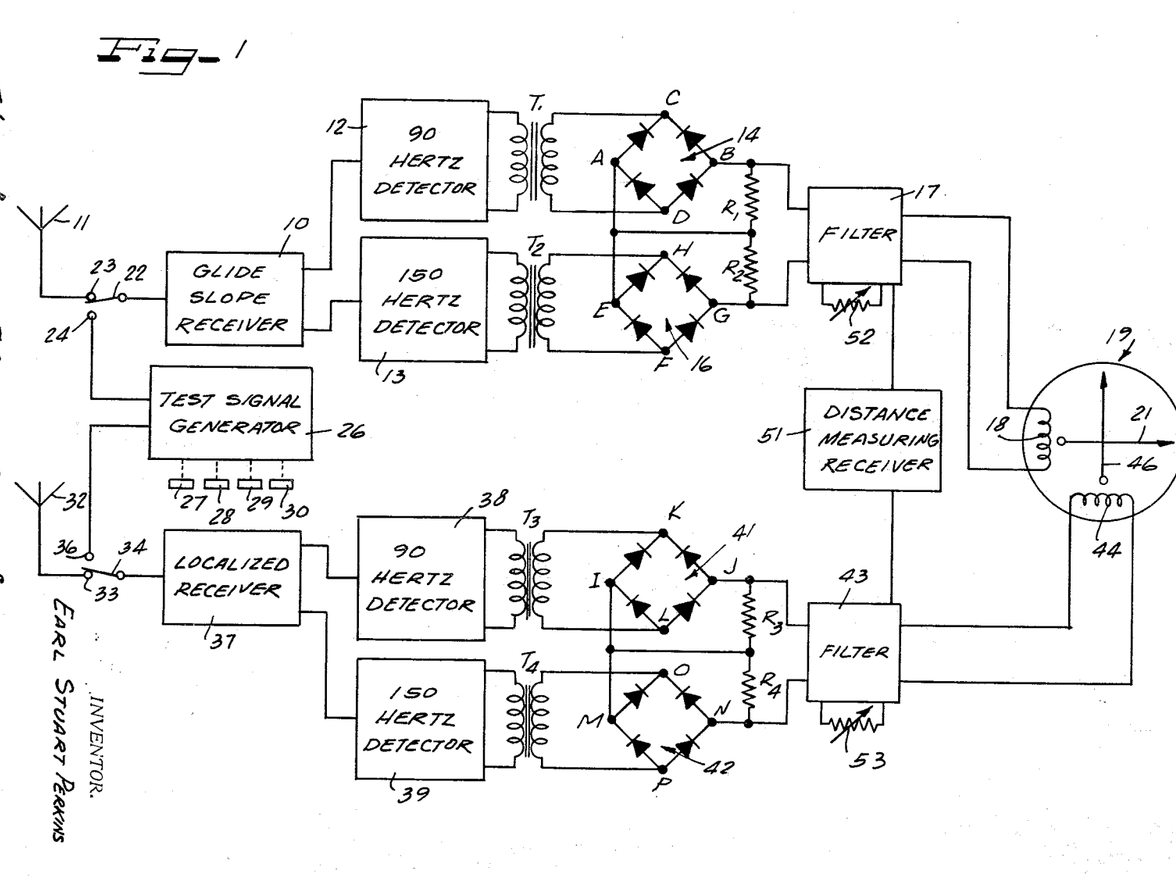
FIGURE 1 illustrates a landing system according to my invention.

I have also discovered that if detectors, filters, transformers and indicators are properly designed, many of the scallops and perturbations believed inherent in the transmitted signal will be eliminated. FIGURE 1 illustrates a landing system according to my invention. A glide slope receiver 10 is connected to a suitable antenna 11 and supplies inputs to the 90 hertz detector 12 and the 150 hertz detector 13. A transformer $T_1$ has its primary connected to the output of detector 12 and its secondary supplies an input to rectifier 14.

A transformer $T_2$ has its primary connected to 150 hertz detector 13 and its secondary is connected to rectifier 16.

A pair of resistors $R_1$ and $R_2$ are connected between points B and G of detectors 14 and 16 and their junction points is connected to points A and E of rectifiers 14 and 16.

A filter 17 is connected across resistors $R_1$ and $R_2$ and supplies an output to the meter movement 18 of a meter 19 which has a horizontal indicator 21.

A switch 22 is connected to the input of receiver 10 and is movable to engage contact 23 which connects the receiver 10 to antenna 11 or to engage contact 24 which is connected to the output of signal generator 26. Signal generator 26 has a plurality of controls 27, 28, 29 and 31 for controlling various outputs of generator 26.

An antenna 32 is connected to a contact 33 engageable by a switch 34 that is connected to a localizer receiver 37. Switch 33 may be moved to engage contact 36 which is connected to an output of generator 26. A 90 hertz detector 38 receives an output from receiver 37 and supplies an output to the primary of a transformer $T_3$. A 150 hertz detector 39 receives an input from receiver 37 and supplies an output to the primary of transformer $T_4$.

A rectifier 41 has points K and L connected across secondary of transformer $T_3$ and a rectifier 42 has points O and P connected across the secondary of transformer $T_4$. A pair of resistors $R_3$ and $R_4$ are connected across points J and N of the rectifiers 41 and 42 and their junction point is connected to points I and M.

A filter 43 is connected across resistors $R_3$ and $R_4$ and supplies an output to meter movement 44 which drives left-right indicator 46 of meter 19.

In operation, conventional landing systems have had non-symmetrical and non-linear responses which were thought to be perturbations in the received signal. However, I have discovered that many of these perturbations are actually generated in the receiver and its related circuitry and indicators. Once it has been accepted that scalloping and perturbations are inherent in the received signal, no attempt is made to eliminate them in the receiver. This erroneous assumption has existed since the start of radio navigation.

I have eliminated many of these perturbations by selecting meter movements, filters, impedances, rectifiers, detectors and receiver components so that symmetrical balanced paths for the 90 and 150 hertz signals exist.

For example, meter movements 18 and 44 are tested and chosen so that they respond symmetrically up and down, and right and left.

The filters 17 and 43 may have adjustable responses so that their outputs vary with the speed of the aircraft and with distance, for example, as in my copending application Ser. No. 559,650. For this purpose, a distance measuring receiver 51 may adjust the pass band of filters 17 and 43. Speed adjustments may be made by potentiometers 52 and 53.

The rectifiers 14 and 16 are matched at all amplitude levels so that the rectified signals are truly indicative of the received signals. The transformers $T_1$ and $T_2$ are chosen so that their responses are matched. For example, if one transformer has a different hysteresis characteristic than the other, this will result in one channel responding differently than the other. Therefore, transformers are tested over all possible received frequencies and amplitudes and two transformers are chosen which have balanced characteristics.

The detectors 12 and 13 are also matched so that for signals of equal energy they produce equal response.

In the same manner that localizer channel is constructed of matched components with the detectors 38 and 39 matched, the transformers $T_3$ and $T_4$ matched and the rectifiers 41 and 42 matched. These components are tested and matched before installation in the overall system and then the overall system is tested by moving switches 22 and 34 to engage contacts 24 and 36.

The signal generator 26 produces R.F. signals with 90 and 150 hertz modulation and the amplitude of these signals may be varied by knobs 27, 28, 29 and 30. It is to be realized that amplitude of the R.F. as well as the 90 an and 150 hertz signals may be varied to simulate various distances from a landing runway and various transverse or vertical positions. The meters 21 and 46 are monitored to determine if any non-linearily or lack of symmetry occurs in the complete equipment. If so, components are changed until the meter 19 indicates accurate and symmetrical response.

With these techniques, a greatly improved landing system results in that many perturbations previously thought to exist in the transmitted signal are eliminated and an aircraft may be controlled much more accurately than has previously been thought possible.

Figure 2:
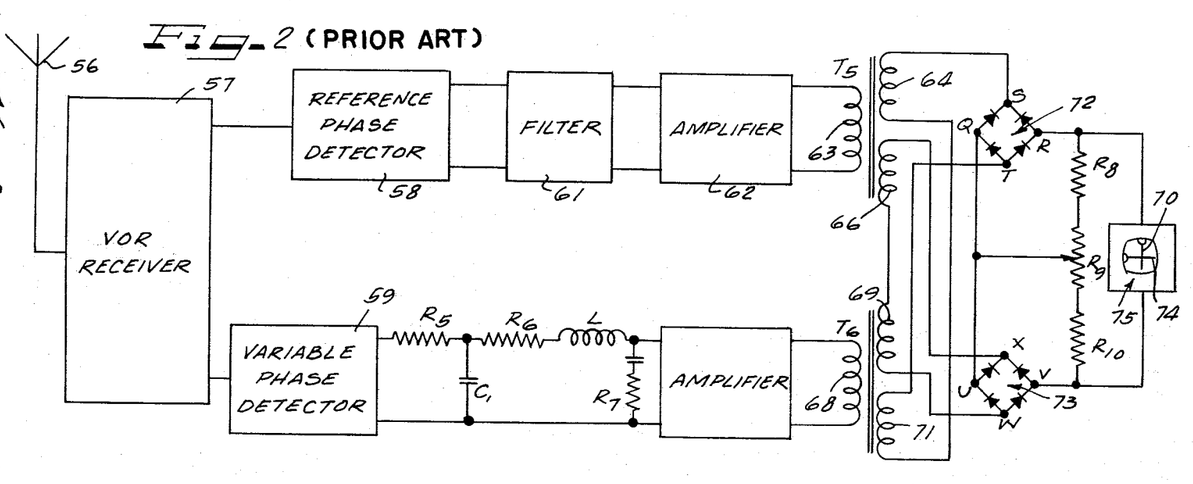
FIGURE 2 illustrates a prior art VOR system.

FIGURE 2 illustrates a prior art VOR system which has an antenna 56 that is connected to VOR receiver 57. Receiver 57 demodulates and separates the reference and variable phase VOR signals and supplies them to detectors 58 and 59. A filter 61 is connected to detector 58 and amplifier 62 is connected to filter 61. The primary 63 of phase detector transformer $T_5$ is connected to amplifier 62.

A 30 hertz filter comprises series resistors $R_5$ and $R_6$ and inductance L and parallel capacitor $C_1$ and capacitor $C_2$ and resistor $R_7$. An amplifier 67 receives the output of the filter and supplies an output to primary 68 of phase detector transformer $T_6$.

Diode rectifiers 72 and 73 are connected to secondaries 64, 66, 69 and 71 of transformers $T_5$ and $T_6$, as shown, and provide an output to the meter 75 to drive needle 70.

Figure 3:
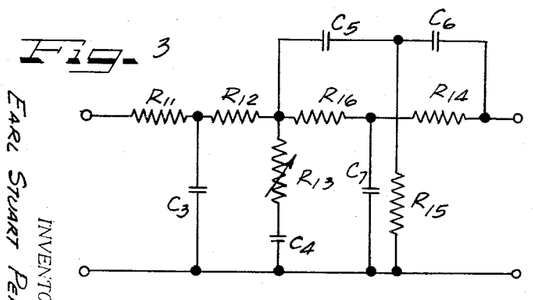
FIGURE 3 illustrates a twin T filter used in conventional navigation receivers.

Certain prior art receivers have replaced the filter shown in FIGURE 2 with the low pass filter followed by the twin T filter as shown in FIGURE 3. The low pass filter comprises series resistors $R_{11}$ and $R_{12}$ and parallel branches $C_3$ and $R_{13}$ and $C_4$. The twin T comprises series resistors $R_6$ and $R_{14}$ in parallel with capacitors $C_9$ and $C_6$ and a resistor $R_{15}$ extends from the junction between capacitors $C_5$ and $C_6$ to the junction point of capacitors $C_3$, $C_4$ and $C_7$.

I have discovered that many of the scallops which have been assumed to be inherent in the transmitted signals are actually generated in the conventional VOR receivers. For example, receivers such as shown in FIGURE 2 are subject to errors caused by amplitude fluctuations between the two 30 hertz channels. There are at least two significant types of errors. One arises from the rectification circuitry which generates the bearing and the to-from meter indications. The second error arises from lack of symmetry in the 30 hertz filter characteristics including lack of symmetry in any servo systems in the indicating or control system. Other errors arise from amplitude effects in the detection of the F.M. subcarrier.

I have verified that these errors exist by testing conventional receivers by varying the amplitude of the output of an omni-test signal generator and feeding it into omni receivers. The amplitude was varied from zero to several hertz and large errors were noted in the output indications of the receiver.

In the circuit of FIGURE 2, the reference and variable signals determines when the aircraft is on the selected radial. When the aircraft deviates from the selected radial, the phase of the variable signal changes. It can be shown that the movement (M) of needle 70 will be:

$$M = K[2E_v E_R/(E_R^2 + E_v^2)^{1/2}] \sin \phi$$

where K is a proportionality constant, Ev is the variable phase voltage, $E_R$ is the reference phase voltage, and $\phi$ is the actual reference angle.

By inspection, it will be seen that needle 70 will be displaced by magnitude changes of both signal Ev and $E_R$ as well as by changes in $\phi$.

For example, if $E_v = E_R$ and $\phi = 1$ degree $$M = K\sqrt{2} E_R \sin 1 \text{ degree}$$

If Ev doubles in magnitude then $$M = K[4/(5)^{1/2}] E_R \sin 1 \text{ degree}$$

and M increases 27 percent.

Changes in phase of either the reference or the variable signal result in direct changes in the angle $\phi$. Thus, a change in phase of either signal inside the receiver cannot be distinguished from an actual bearing change from the VOR transmitter. I have discovered that this type of error occurs with sufficient magnitude that it is a serious problem and can lead to dangerous conditions in aircraft navigation.

The filters used in conventional receivers such as shown in FIGURES 2 and 3 are non-symmetrical and convert some of the amplitude modulation on the signals to phase modulation which is a direct error that will appear in the output.

Also, non-linear FM detectors are used in present receivers and as the incoming signal varies in amplitude it moves up or down the slope of the resonant curve of the tuned circuit of the FM detectors which results in phase errors that will be in the output.

Figure 4:
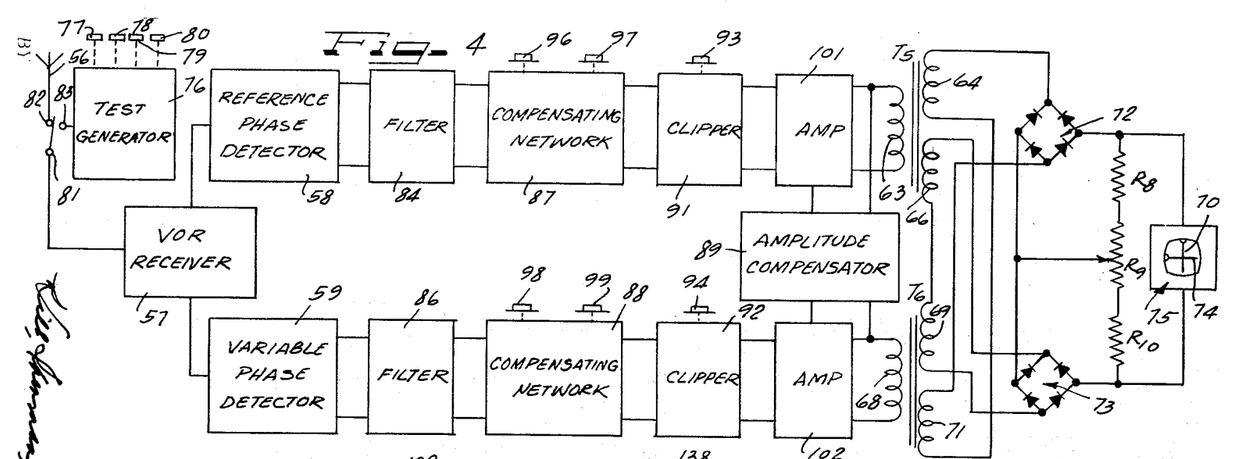
FIGURE 4 illustrates an improved VOR system according to my invention.

FIGURE 4 illustrates a VOR receiver and system according to my invention. Like elements in FIGURES 2 and 4 are identified by the same numbers.

A test generator 76 with control knobs 77, 78, 79 and 80 is connected to contact 83 of switch 81 that is connected to the input of the VOR receiver 57. The switch may be moved to engage contact 83 or contact 82 which is connected to antenna 56.

Filters 84 and 86 receive the outputs of detectors 58 and 59 respectively and are designed to produce minimum amplitude and phase shift errors. A pair of compensating networks 87 and 88 receive the outputs of filters 84 and 86 and have control knobs 96, 97 and 98, 99 that allow the amplitude and phase shift of the networks to be adjusted to compensate for phase and amplitude errors caused by filters 84 and 86.

A pair of amplitude clippers 91 and 92 receive the outputs of networks 87 and 88 and amplitude-clip the signals to reduce errors caused by amplitude modulation. Control knobs 93 and 94 allow the level of clipping to be set in the clippers.

Amplifiers 101 and 102 receive the outputs of clippers 91 and 92 and supply inputs to primary windings 63 and 68 of transformers $T_5$ and $T_6$. An amplitude comparator 89 receives outputs from amplifiers 101 and 102 and controls the gain so that the amplitude of their outputs is the same.

The transformers $T_5$ and $T_6$, the rectifiers 72 and 73, detectors 58 and 59 are selected so that the paths for the reference phase and the variable phase signals will be symmetrical. This may be done in part by selecting the components in pairs which are identical before assembly in the receiver. Then the switch 81 is moved to connect the test generator 76 to the receiver and the complete system is tested while varying the input with knobs 77 78 79 and 80. The amplitude and phase of both the reference and phase signals may be varied and the compensating networks 87 and 88 and clippers 91 and 92 may be adjusted until the indicator 73 indicates the correct phase relationship between the signals for all inputs.

Figure 5:
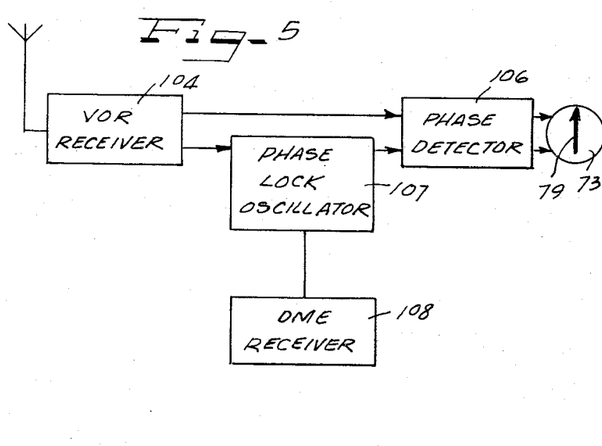
FIGURE 5 illustrates an improved VOR system.

Thus a navigation receiver is produced which does not introduce errors such as are produced with present VOR receivers, Another form of improved VOR system is shown in FIGURE 5 The VOR receiver 104 detects the reference and variable 30 hertz signals and supplies the reference signal to a phase detector 106. A phase lock oscillator 107 supplies an input to phase detector 106 and receives a phase control signal from receiver 104. This controlled signal slowly corrects the phase of the phase lock oscillator so that its phase is the average phase of the variable 30 hertz input Such phase lock oscillators are used in television receivers and are well known to those skilled in the art. Also any standard automatic phase control could receive the outputs of oscillator 107 and the variable 30 hertz signal and control the phase of the oscillator so that it slowly follows the variable 30 hertz signal.

A distance measuring receiver 108 is connected to the oscillator 107 to adjust the coupling between the control signal and the oscillator for the purpose described in the copending application. Ser. No. 559,650.

The structure of FIGURE 5 eliminates many of the phase errors introduced in the receiver and a much improved response is obtained.

Figures 6, 8:
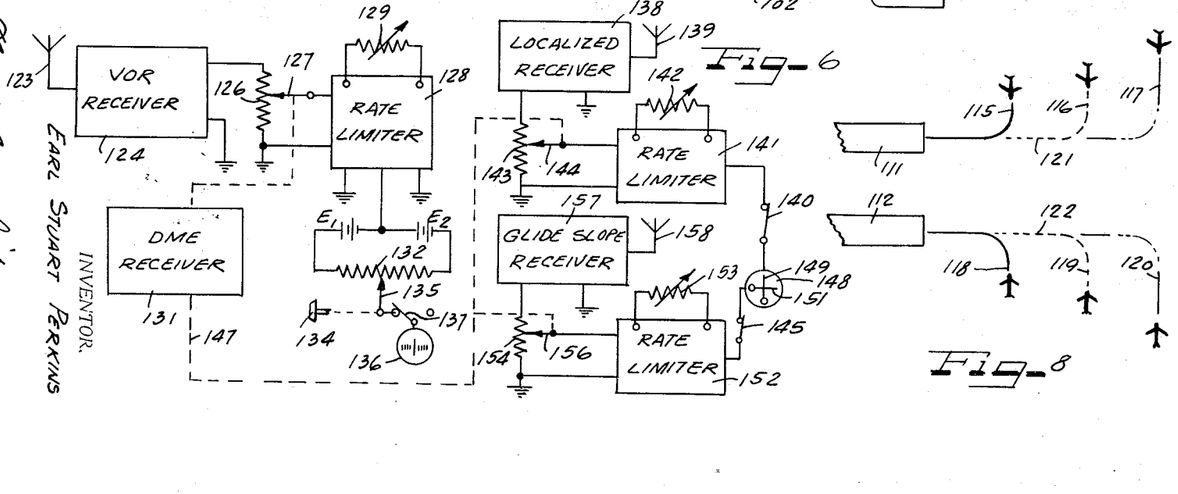
FIGURE 6 illustrates a VOR and ILS system with filtering responsive to a function of distance.
FIGURE 8 illustrates the manner in which the navigation system of FIGURE 7 may be used to control the approach and landing or take-off and dispersal of large numbers of aircraft.
Figure 7:
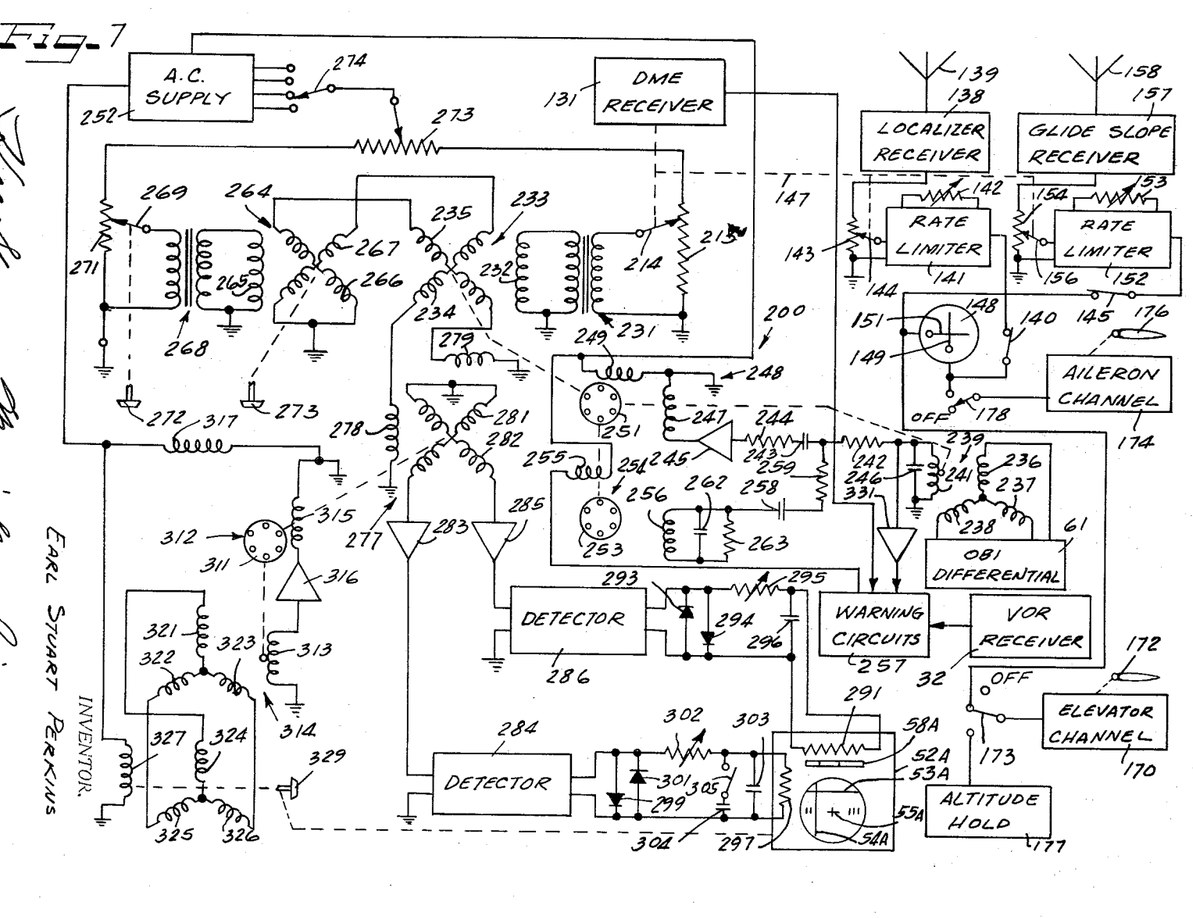
FIGURE 7 illustrates a navigation system for cross-country navigation and a landing system utilizing filtering responsive to function of distance and in which an automatic pilot may be used if desired.

FIGURES 6, 7 and 8 illustrate the manner in which the improved ILS and VOR systems of this invention may be utilized in combination with the improved navigation system disclosed in my copending application Ser. No. 559,650.

FIGURE 8, for example, illustrates a pair of parallel runways 111 and 112 at an airport. A plurality of aircraft, some, most or all of which carry the equipment of either or both of these inventions are to be landed on runways 111 and 112. The system described in detail in my copending application, Ser. No. 559,650, allows a plurality of parallel tracks 115, 116, 117, 118, 119, and 120 to be selected and flown by aircraft on these tracks.

The offset course computer allows the craft to safely fly parallel courses.

As the craft respectively approach the extensions 121 and 122 of the runways 111 and 112 they switch from offset course computer mode to ILS mode and fly the landing systems associated with runways 111 and 112. Two separate landing systems may be utilized, one for each runway or one landing system with an offset computer according to the teachings on my application, Ser. No. 559,650 may be utilized to offset the localizer by the spacing between runways.

The craft 115–120 will be spaced in the approach pattern as shown and will allow greater safety and accuracy in a terminal area which are presently under great stress. The VOR and ILS receivers of the systems of FIGURES 6, 7 and 8 will be constructed according to my teachings and will not introduce the errors caused by conventional receivers.

FIGURE 6 illustrates a system which may be used to approach and land at a terminal area as shown in FIGURE 8. The antenna 123, VOR receiver 124, DME receiver 131, rate limiter 128 and offset potentiometer 132 and contact 135 are similar to the system described in my copending application, Ser. No. 559,650, except the VOR receiver is constructed according to the teachings of the present invention. Thus, knob 134, allows any selected offset course to be flown into a terminal area, for example. As the terminal area is approached, the switch 137 may be moved to disconnect the VOR system and switches 140 and 145 may be closed to connect glide slope receivers 157 and localizer receiver 138 to indicators 151 and 149 of meter 148.

Receiver 157 supplies an output to potentiometer 154 that has wiper contact 156. A rate limiter 152 with speed adjustment 153 is connected to contact 156 and supplies an input to meter 148.

Receiver 138 supplies an output to potentiometer 143 which has a wiper contact 144 that feeds rate limiter 141. A speed adjustment 142 forms a part of limiter 141. The output of limiter 141 is supplied to meter movement 149 of indicator 148.

The output shaft 147 of DME receiver 131 controls contacts 127, 144 and 156 to adjust the filter responses as a function of distance as described in detail in my copending application, Ser. No. 559,650.

Thus, this system allows a selected VOR offset course to be flown and then a transistion is made to the landing receivers 138 and 157 for the final approach and landing. All of the VOR and ILS receivers are to be constructed according to this invention.

FIGURE 7 illustrates the combination of the ILS system of FIGURE 6 with the complete navigation system described in my copending application, Ser. No. 559,650. FIGURE 7 illustrates a complete aircraft navigation system 200 combining many of the features of the systems described above in a computer-operated apparatus for navigation by rectilinear coordinates. In navigation system 200 the variable tap 214 of a DME receiver potentiometer 213 is coupled through a transformer 231 to the stator winding 232 of a rotary AC resolver, identified in the drawing as a received data resolver 233. Resolver 233 is of conventional construction and includes the usual pair of quadrature rotor windings 234 and 235. A second stator winding may be included, in accordance with usual practice, but is not used in the received data resolver 233 and hence has not been illustrated.

As in some of the devices described above, the VOR receiver 32 that is incorporated in navigation system 200 drives a synchro differential 61 that is a part of the omnibearing indicator of the receiver. The differential 61 is electrically connected to the three stator windings 236, 237 and 238 of a conventional control transformer 239. One terminal of the rotor winding 241 of control transformer 239 is connected to system ground. The other terminal of winding 241 is connected through a series resistor 242, a capacitor 243, and a further series resistor 244 to a servo amplifier 245. A capacitor 246 may be connected in parallel with rotor winding 241.

The output of servo amplifier 245 is connected to one terminal of a first field winding 247 of a servomotor 248, the other terminal of winding 247 being connected to system ground. Motor 248 is a conventional two phase servomotor and includes a quadrature stator winding 249 and a rotor 251 that is inductively coupled to both of the windings 247 and 249. The quadrature winding 249 of motor 248 is connected to a suitable AC power supply 252 which may comprise the conventional 26 volt, 400 cycle supply available in most aircraft. The rotor 251 of the servomotor is mechanically connected to the rotor of the received data resolver 233, comprising windings 234 and 235, and is utilized to control the angular position of the resolver rotor relative to the stator winding 232 as described more fully hereinafter.

The rotor 251 of servomotor 248 is also mechanically coupled in driving relation to the rotor 253 of a tachometer generator 254.

Generator 254 is a conventional AC rate generator, and comprises two stator windings 255 and 256 arranged in spaced quadrature relation to the rotor 253, to which both windings are inductively coupled. Winding 255 comprises the input winding of the tachometer generator and is electrically connected to the AC supply 252 and to a warning circuit unit 257 described more fully hereinafter. Stator winding 256 is the output winding of the tachometer generator.

One terminal of output winding 256 is connected to system ground. The other terminal is connected through a series capacitor 258 and a series resistor 259 to the common terminal of the resistor 242 and the capacitor 243 in the input circuit to servo amplifier 245. This circuit affords a negative feedback circuit from tachometer generator 54 back to the input of servo amplifier 245. Preferably, a parallel RC circuit comprising a capacitor 262 and a resistor 263 is connected in shunt with winding 256 to provide for phase and amplitude adjustment of the generator output.

Navigation system 200 further includes a way point bearing resolver 264 that is essentially a duplicate of the received data resolver 233. Thus, resolver 264 comprises a stator winding 265 and two rotor windings 266 and 267 that are arranged in space quadrature with respect to each other. Again, in the normal commercial form resolver 264 would include a second stator winding but this winding is not used and hence has not been illustrated.

The stator winding 265 of the waypoint bearing resolver 264 is coupled through a transformer 268 to the movable tap 269 of a potentiometer 271. The tap 269 of potentiometer 271 is manually adjustable by suitable means generally illustrated by the distance setting knob 272. The knob 272, or other setting means, is calibrated to adjust potentiometer 271 for varying radial distances from the navigation station to a selected waypoint. The potentiometers 213 and 271 are connected through a trimming potentiometer 273 to a scale factor control 274. The scale factor control 274 comprises a multi-tap connection to the AC supply 252 to modify the amplitude of the AC voltage supplied to potentiometers 213 and 271 to achieve different scale settings for navigation system 200.

Means are also provided for manually adjusting the angular position of the rotor of resolver 264 relative to its stator. In FIG. 7, this arrangement is shown in simplified form and comprises a bearing setting knob 275 that is mechanically connected to the resolver rotor. With respect to both of the manually adjustable setting knobs 272 and 275, it should be recognized that appropriate servo mechanisms or other indirect linkages may be employed instead of the simple manual drives illustrated, if desired.

The rotor windings 234 and 235 of the received data resolver 233 and the rotor windings 266 and 267 of the waypoint bearing resolver 264 are connected together in the input of a track resolver 277. Thus, one terminal of rotor winding 267 of resolver 264 is connected to system ground and the other terminal is connected to one end of the received data resolver winding 234, the other terminal of winding 234 being connected to a first stator winding 278 in track resolver 277. The stator winding 278 is returned to system ground to complete the circuit. A similar circuit arrangement connects the rotor winding 266 of waypoint bearing resolver 264 in series with the received data resolver winding 235 to a second quadrature stator winding 279 for the track resolver 277.

The rotor of track resolver 277, like the rotors of the resolvers described above, comprises two quadrature windings 281 and 282. One terminal of winding 281 is connected to system ground. The other terminal of this track resolver rotor winding is connected to an amplifier 283 which in turn is coupled to a detector circuit 284. Similarly, one terminal of resolver winding 282 is connected to system ground and the other terminal is connected through an amplifier 285 to a detector circuit 286. The two detector circuits 284 and 286 provide individual drive signals for a combined linear deviation indicator instrument 52A.

In the rectilinear situation indicator 52A, incorporated in system 200, the vertical movements of the horizontally extending distance indicator line 53A are effected by an appropriate meter movement or "motor" generally represented in FIG. 7 by the resistor 291. A resistor has been shown because devices of this kind ordinarily are substantially resistive in their impedance characteristics. The meter movement 291 is coupled to the detector 286 by means of a limiter circuit. The limiter circuit comprises a pair of diodes 293 and 294 connected in opposed polarities in shunt relation to the output terminals of detector 286. The limiter circuit further includes a series resistor 295 and a shunt capacitor 296. It is thus seen that the limiter circuit is, essentially, a resistance-capacitance integrating circuit which also serves to limit the amplitude of the signal that is integrated and supplied to the meter movement 291.

The meter movement or other appropriate "motor" that controls the position of the vertically extending linear displacement indicator line 54A in the rectilinear situation indicator 52A is represented, in FIG. 7, by the resistance 297. The "motor" 297 is electrically connected to the detector circuit 284 by a response rate limiting circuit that is generally similar to the other limiter circuit.

Thus, this circuit includes two diodes 299 and 301 that are connected in shunt relation to the output terminals of detector 284 but in reversed polarities relative to each other. The circuit further includes a series resistor 302 and a shunt capacitor 303 affording a resistance-capacitance integrating circuit. In addition, however, the circuit includes a second capacitor 304 that is substantially larger than capacitor 303. Capacitor 304 may be connected in parallel relation with capacitor 303, or may be disconnected from the circuit, by operation of a switch 305.

Returning to track resolver 277, it is seen that the rotor of this resolver, comprising windings 281 and 282, is mechanically connected to the rotor 311 of a servomotor 312. Servomotor rotor 311 is also used to drive the rotor 313 of a control transformer 314. The rotor winding 313 of control transformer 314 is connected back to the control winding 315 of servomotor 312 through an amplifier 316 to complete a null-seeking servo circuit. The quadrature input winding 317 of servomotor 312 is connected to the AC supply 252.

The primary of control transformer 314 comprises the windings 321, 322 and 323, each having one terminal common with the others. Windings 321, 322 and 323 are individually connected to the secondary windings 324, 325 and 326, respectively, of a synchro transmitter 328. Windings 324–326 are electrically connected to each other to complete the synchro circuit. The primary winding 327 of synchro transmitter 328 is electrically connected to the AC supply 252. Winding 327 is the rotor winding for the synchro transmitter and is mechanically connected to a course setting means represented by a knob 329. The control knob or other setting means 329 is also mechanically connected to the RSI instrument 52A for setting of the course that appears in the window 58A of the instrument. In normal practice, the setting knob 329 is located immediately adjacent the instrument 52A for the convenience of the pilot.

Considering operation of the complete aircraft navigation system 200, perhaps the best starting point is the VOR receiver 32. The VOR receiver is mechanically coupled to an appropriate synchro differential 61, which may be a part of the OBI instrument of the aircraft. The VOR receiver is connected to the secondary of the synchro differential, the primary being connected to an appropriate fixed transmitter (not shown). The output signals from differential 61, representative of received bearing signals as derived by VOR receiver 32, are supplied to the input windings 236–238 of control transformer 239.

Whenever the rotor of control transformer 239 is not exactly aligned with the primary windings of the control transformer, as when a change in bearing has occurred, an error signal is produced in rotor winding 241 and is applied to the control winding 247 of servomotor 248 through the coupling circuit comprising resistor 242, capacitor 243, resistor 244, and amplifier 245. The resulting rotation of the servomotor rotor 251 repositions the rotor 234, 235 of the received data resolver 233. Thus, the angular orientation of the received data resolver rotor is continuously maintained at a position indicative of the bearing of the aircraft as derived from the signals from VOR system 32.

The mechanical coupling from servomotor rotor 251 to tachometer generator rotor 253 causes the tachometer generator to develop an output signal whenever the servomotor rotates. The signal from tach generator 254 is coupled back to motor amplifier 245 in a negative feedback circuit comprising capacitor 258 and resistor 259. The negative feedback circuit functions to limit the response rate of the servomotor and thus effectively damps changes in the angular position of the received data resolver 233. Accordingly, tachometer generator feedback circuit reduces the effect of high-amplitude short-duration perturbations in the received VOR signals, much like a low-pass filter, enhancing both the usability and the accuracy of the information derived from those signals and represented ultimately by the angular positioning of received data resolver 233. It will be recognized that the mechanical connection from motor rotor 251 back to control transformer rotor 241 affords a null-seeking servo arrangement, like those described above, in which the rotational movement of the servomotor is interrupted as soon as the control transformer rotor is re-positioned in an alignment corresponding to changed signal amplitude conditions in the control transformer primary.

In addition to the bearing information supplied to the received data resolver 233 by means of the angular positioning of the resolver rotor from servomotor 251, it is also necessary to apply distance information to the resolver. This is accomplished by the connection from the DME receiver 34 to the potentiometer 213. Thus, the amplitude of the input signal supplied to the stator winding 232 of resolver 233 is proportional to the distance of the aircraft from the navigation system. This being the case, it can be shown that the output signal on one of the windings 234 and 235 is of the form $R' \sin \theta'$, where $R'$ represents the distance of the aircraft from the navigation system as derived from DME receiver 34 and $\theta'$ represents the bearing angle relative to magnetic north at the station as derived from the VOR receiver 32. Resolver 233 thus constitutes an $R-\theta$ computer.

The waypoint bearing resolver 264 functions in precisely the same manner as received data resolver 233, but on the basis of the distance of the navigation station from a predetermined distant waypoint and bearing of the waypoint relative to magnetic north at the station. The pilot selects a given waypoint to which he wishes to fly, a point that is within reception distance of the signal from the VORTAC station to which receivers 32 and 131 are tuned. The distance setting means 272 is adjusted to the distance R″ from the station to the selected waypoint. As a consequence, a signal having an amplitude proportional to that distance is supplied to the input winding 265 of waypoint bearing resolver 264. The bearing relative to the selected wapoint is fed into the resolver by adjusting the bearing setting means 275, rotating the resolver secondary 266–267 to an orientation representative of this bearing. Consequently, the amplitudes and phase relations of the signals induced in winding 266–267 are representative of the rectilinear coordinates of the waypoint with respect to the navigation station. That is, resolver 264 functions as an $R-\theta$ computer with respect to the waypoint location.

The east-west coordinate signals from resolver 233 and 264 could be subtracted from each other, in an appropriate electrical circuit, to develop a signal indicative of the displacement of the aircraft from the direct path to the waypoint in this coordinate direction. Similarly, the north-south coordinate signals from the two resolvers could be subtracted to develop a deviation signal representative of the difference between the waypoint bearing data and the actual bearing data in that direction. But this information would still be in arbitrary north-south and east-west coordinates and a display of the information would present substantial difficulties with respect to scale factor of the indicator means 52A.

In the computer system 200, the two sets of coordinate signals developed in the received data resolver winding 234 and the waypoint resolver 267 are effectively subtracted from each other by means of the series connection of those windings, so that the signal supplied to the input winding 278 of track resolver 277 constitutes a difference signal representing deviation one coordinate axis. Similarly, the combined signal from winding 235 and 266 that appears across the input winding 279 of the track resolver represents a difference signal related to the other coordinate axis. But further resolution of these signals is required before application to the indicator means 52A.

Thus, it is highly desirable to have display 52 oriented, in terms of the indication given to the pilot, along the track or path to be actually followed by the aircraft. More importantly, it is desirable to orient the display along the track to permit expansion of the scale factor of the indicator means to a maximum to give closer control of diviations from the track. To accomplish this end, the rotor 281, 282 of track resolver 277 is oriented, by the pilot, to a position representative of the actual bearing along which the aircraft will fly to the waypoint. The pilot adjusts the adjusting means 329 to orient the rotor 327 of synchro transmitter 328 to a position representative of the desired bearing. The requisite angular information is transmitted to control transformer 314, which drives servomotor 311 until the servomotor re-orients the rotor 313 of the control transformer at a null position. The angular movement of the servomotor rotor 311 effectively re-positions the track resolver rotor 281, 282 at the desired position representative of the orientation of the flight path.

The coordinate rotation function of track resolver 277 can perhaps best be understood when the aircraft is flying along the selected track to a waypoint. The initial information relative to the position of the aircraft is developed, in received data resolver 233, on the basis of the east-west and north-south coordinate X1 and Y1. The track resolver 277 operates effectively to rotate the coordinate system so that the information ultimately presented to the indicator means by which the pilot navigates is expressed in terms of the rotated coordinates X2 and Y2. It is seen, therefore, that the track resolver has a dual function; it operates to sum up the waypoint bearing information from resolver 264 and the current position data from resolver 233, and at the same time rotates the information from those two resolvers to produce output signals in a coordinate system oriented along the projected track of the aircraft.

The signal developed in winding 281 of track resolver 277 is directly representative of the lineal displacement of the aircraft to the left or to the right of the selected track to the waypoint or destination toward which the aircraft is moving. This signal, after amplification in circuit 283 and detection in circuit 284, is supplied to the meter movement or motor 297 that drives the left-right indicator 54A in instrument 52A. The signal supplied to the "motor" 297 is a DC signal, the amplitude of the required movement being represented by the amplitude of the signal and the direction of movement by the polarity of the signal.

The rate of response of motor 297, and hence the rate of movement of indicator 54A, is limited to a preselected maximum by the limiter circuit 298. The two diodes 299 and 301 effectively set a maximum limit for the amplitude of the signal; typically, if silicon diodes are employed, this limit is established at about 0.6 volt whereas if germanium diodes are utilized the signal amplitude limitation is of the order of 0.3 volt. For any input signal equal to or exceeding this amplitude limitation, the signal supplied to motor 297 is the time integral of the received signal at an integration rate established by the size of the capacitors 303 and 304 and the impedance of the resistor 302. For normal enroute flight, switch 305 is closed so that the capacitor 304 is effective in the integrating circuit.

Limiter circuit 298 should be constructed or adjusted to fit the normal operating speed range of the aircraft in which it is installed. This can be accomplished by specific selection of resistor 302 and capacitors 303 and 304 to provide an integration rate, and hence a response rate, correlated to the maximum speed of the aircraft. On the other hand, a standardized unit may be constructed for use in all aircraft, in which case the resistor 302 or the capacitor 304, or both, may be adjustable devices, permitting adjustment of the limiter circuit to meet the actual navigation requirements of the aircraft.

It will be apparent that limiter functions by establishing a maximum response speed for the left-right deviation indicator means 54A in instrument 52A. Because the signal information that is translated into movements of indicator 54A is in terms of lineal displacement, regardless of the angular position of the aircraft with respect to the navigation station, movements of indicator 54A are always in terms of aircraft movements in miles per hour. Thus, establishment of a fixed maximum rate of response for the indicator 54A automatically and inherently limits the instrument response rate in accordance with the actual navigation requirements of the aircraft, so long as the maximum limit is properly related to the speed of the aircraft.

The control arrangement for the to-and-from indicator 53A of instrument 52A is essentially similar to that for the left-right deviation indicator 54. Thus, the output signal from track resolver winding 282 is amplified in circuit 285 and detected in circuit 286. The resulting DC signal is supplied through the limiter to the meter movement or motor 291 in the RSI instrument. Again, the two diodes 293 and 294 establish a fixed maximum for the signal supplied to the indicator means. Moreover, this signal is integrated, with respect to time, for signal levels above the maximum, in the RC integrating circuiting 295–296. By proper selection of capacitor 296 and resistor 295, relative to the voltage characteristics of diodes 293 and 294, the limiter circuit effectively establishes a maximum response rate for movements of the to-from indicator means 53A that is directly correlated to the navigational needs of the aircraft.

In computer navigation system 200, it is significant that "smoothing" of the bearing data from VOR receiver is carried out in two places in the circuit. The initial smoothing or filtering action occurs in the servo loop comprising control transformer 239, servomotor 248, and tach generator 254. This "pre-encoding" smoothing or filtering of the relatively short-duration high-amplitude transients frequently present in the output of VOR receiver 32 is quite desirable, substantially enhancing the usability of the bearing information supplied to received data resolver 233. But the pre-encoding smoothing of the bearing signal information is accomplished without reference to displacement from the navigation station and without specific reference to the speed range of the aircraft and hence does not realize the full advantages of the present invention.

The second smoothing or filtering operation accomplished in the limiters is directly correlated with the aircraft speed range and with the displacement of the aircraft from the navigation station. In theory, the response rate limitations imposed by the response rate control means is sufficient to achieve the desired enhancement of accuracy and usability of the bearing data. In practice, the system illustrated, with some smoothing accomplished prior to encoding in the data resolver 233 and some accomplished afterward, tends to produce more consistent and accurate results.

During the time in which the aircraft flies down the selected track to a particular waypoint, capacitor 304 remains connected in the limiter circuit. At the first waypoint on a flight, however, the pilot must re-set system 200 for a further waypoint and, usually, must encode the system to a different VORTAC station. The time delay in response of the left-right indicator 54A that is caused by the presence of capacitor 304 in the circuit may be too great to allow for easy adjustment of the system by the pilot. With capacitor 304 in the circuit, it may take as much as ten to twenty seconds for system adjustment, whereas the delay should be held to five seconds or less to enable the pilot to complete encoding in a reasonable and expeditious manner. It is for this reason switch 305 is provided, permiting the pilot to disconnect capacitor 304 and thereby achieve a marked increase in the response rate of the RSI instrument, and particularly indicator 54A, when setting the system for a new waypoint or course. Switch 305 is also opened to increase the response rate when the aircraft is maneuvering in a terminal area, to permit more rapid response of the instrument for landing approach purposes.

The rectilinear situation indicator 52A, as actuated by the system 200, comprises two individual indicator means, both of which indicate course deviations of the aircraft and both of which utilize, in part, both the original bearing signal developed by VOR reciver 32 and the distance signal from DME receiver 34. Thus, the indicator element 53A is ordinarily controlled, in substantial part, by the bearing signal as well as the distance signal, since the computer portion of system 200 requires both signals to resolve the relative position of the aircraft into rectilinear coordinates and to present the same on the basis of the predetermined track set into resolver 277. Thus, correction and compensation for erratic excursions in both navigation signals is important with respect to both of the indicator means 53A and 54A of device 52A, and it is for this reason that the two control means 292 and 298 for limiting the maximum response rate of the indicator means are incorporated in the system.

In selecting the limiting maximum rate of response for the indicator instrument or other indicator means in any of the systems described above, a determining factor is the maximum operating speed of the aircraft. However, the limiting response rate for the instrument or other indicator means should not be selected to be actually matched to the maximum speed of the aircraft. For example, if the full scale width of the display field for instrument 52A is set to be equal to four miles, by scale factor setting 274, and the maximum speed of the aircraft is four miles per minute, the response rate for indicator 54A should not be limited to a rate that will require a full minute for the indicator element to traverse the full width of the instrument. Instead, a maximum rate representative of a somewhat higher aircraft speed should be selected, to permit effective operation of the aircraft navigation system when the aircraft has a tailwind of reasonable magnitude. For high-altitude high-speed aircraft, such as jet aircraft capable of speeds in excess of six hundred miles per hour, which may operate in a jet-stream, the maximum response rate for the indicating means should be equivalent to the maximum speed of the aircraft plus an additional increment of the order of one hundred fifty miles per hour to permit effective operation with a jetstream tailwind. For lower speed aircraft restricted to operation at lower altitudes, a smaller additional increment can be added to the actual maximum aircraft speed in determining the limiting rate for instrument response.

System 200 includes a warning circuit 257 that is connected to the input winding 255 of tachometer generator 254. Warning circuit 257 is also connected to the rotor winding 241 of control transformer 239, through an amplifier 331. In addition, electrical connections are provided from DME receiver 34 and VOR receiver 32 to warning circuit 257.

An autopilot system comprising an elevator channel 170 which controls the elevators 172 may be connected to the output of glide slope receiver 157 by switch 173. The elevator channel may also be connected to altitude hold 177 if desired.

Likewise, an aileron channel 174 which controls ailerons 176 may be connected to the localizer receiver through switch 178.

The details of the autopilot system are not shown, as the various stabilizing and reference signals which are conventional are well known to those skilled in the art.

The system of FIGURE 7 allows aircraft to be controlled by the improved system of application Ser. No. 559,650, and the improved VOR and ILS receivers of this invention to produce an improved control and navigation system.

Although minor modifications might be suggested by those versed in the art, it should be understood that I wish to embody within the scope of the patent warranted hereon all such modifications as reasonably and properly come within the scope of my contribution to the art.

I claim as my invention:

1. A navigation system for a craft responsive to at least a pair of variable phase and reference phase signals of the same frequency transmitted from a ground transmitter which determine selected reference paths comprising,
   a radiant energy receiver receiving the variable and reference phase signals from said transmitter,
   a pair of signal paths connected to said receiver and receiving said variable and reference phase signals, respectively,
   a reference phase detector in the first signal path detecting the reference signal,
   a first amplitude clipper in the first signal path receiving said reference phase signal,
   a variable phase detector in the second signal path detecting said variable phase signal,
   a second amplitude clipper in the second signal path receiving said variable phase signal,
   the amplitude clipping level of said first and second amplitude clipper being the same, and
   phase detecting means receiving the outputs of said first and second signal paths and producing a direct current output with an amplitude and polarity indicative of the craft's position relative to the selected reference path at all times.

2. A navigation system according to claim 1 comprising a zero center meter with low striction connected to the output of said phase detector and the right and left response of said meter such that the meter is deflected a first direction by D.C. signals of one polarity and is deflected equally and in the opposite direction when the D.C. signal is of opposite polarity so that the meter indicates the true displacement of the craft from the selected reference path and eliminates scallops and perturbations.

3. A navigation system according to claim 1 comprising a first filter in said first signal path between said reference phase detector and said first clipper and selected to pass signals at the frequency of the reference and variable signals, a first compensating network connected to the output of said first filter and having phase and amplitude adjusting means, a second filter in said second signal path between the reference phase detector and said second clipper and selected to pass signals at the frequency of said reference and variable signals, and a second compensating network connected to the output of said second filter and having phase and amplitude adjusting means.

4. A navigation system according to claim 1 comprising a test generator for producing reference and variable phase signals of varying phase and amplitude, and switching means for connecting said test generator to said radiant energy receiver.

5. A navigation system according to claim 1 comprising a pair of amplifiers with variable gains connected respectively to the outputs of the first and second amplitude clippers, an amplitude compensator connected to gain control means of said pair of amplifiers and receiving a pair of input signals from the outputs of said amplifiers and controlling their gains so that said output signals have equal amplitudes.

6. A navigation system according to claim 1 wherein said phase detecting means comprises a pair of transformers with symmetrical response connected, respectively, to the outputs of the first and second amplitude clippers, a pair of symmetrical rectifiers connected to said transformers, and the outputs of said rectifiers combined to produce said direct current output.

References Cited

UNITED STATES PATENTS

| | | | |
|---|---|---|---|
| 3,195,059 | 7/1965 | Adams | 325—419 X |
| 2,439,044 | 4/1948 | Ferrill | 343—108 |
| 2,943,321 | 6/1960 | Karpeles | 343—112 |
| 3,098,228 | 7/1963 | Medlinski et al. | 343—107 |
| 3,234,552 | 2/1966 | Bostwick | 343—112 X |
| 3,358,231 | 12/1967 | Baganoff. | |
| 2,539,905 | 1/1951 | Herbst | 343—106 X |
| 2,753,556 | 7/1956 | Pickles | 343—106 |
| 3,142,062 | 7/1964 | Held | 343—106 |
| 3,165,739 | 1/1965 | Long. | |
| 3,414,901 | 12/1968 | Perkins et al. | 343—107 |

OTHER REFERENCES

H. I. Metz, "The CAA–RTCA Instrument Landing System," Part I, 1943, pp. 1–12.

RICHARD A. FARLEY, Primary Examiner

T. H. TUBBESING, Assistant Examiner

U.S. Cl. X.R.

324—83; 325—346, 419, 480; 329—123; 343—109

PO-1050
(5/69)

UNITED STATES PATENT OFFICE
CERTIFICATE OF CORRECTION

Patent No. 3,505,676      Dated April 7, 1970

Inventor(s) EARL STUART PERKINS

It is certified that error appears in the above-identified patent and that said Letters Patent are hereby corrected as shown below:

Column 2, line 20, "thunderstors" should read --thunderstorms--;

line 58, "10" should read --150--.

Column 5, line 17, "$R_6$" should read --$R_{16}$--.

Column 6, line 46, change "," to --.--; line 48, after "5" insert --.--; line 55, after "input" insert --.--;

line 64, after "application" change "." to --,--.

Column 7, line 14, change "om" to --of--.

Column 15, line 2, change "striction" to read --stiction--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents